United States Patent [19]

Saotome et al.

[11] Patent Number: 4,721,856
[45] Date of Patent: Jan. 26, 1988

[54] MAMMOGRAPHIC RADIATION IMAGE RECORDING AND READ-OUT APPARATUS

[75] Inventors: Shigeru Saotome; Masamitsu Ishida, both of Kanagawa, Japan

[73] Assignee: Fuji Photo Film Co., Ltd., Kanagawa, Japan

[21] Appl. No.: 792,386

[22] Filed: Oct. 29, 1985

[30] Foreign Application Priority Data

Oct. 29, 1984 [JP] Japan .................. 59-227538

[51] Int. Cl.$^4$ .................. G03C 5/16; A61B 6/00
[52] U.S. Cl. .................. 250/327.2; 378/37
[58] Field of Search .................. 250/327.2; 378/37

[56] References Cited

U.S. PATENT DOCUMENTS 3,609,355 9/1971 Schwarzer .................. 378/37
4,543,479 9/1985 Kato .................. 250/327.2

Primary Examiner—Carolyn E. Fields
Attorney, Agent, or Firm—Sughrue, Mion, Zinn, Macpeak and Seas

[57] ABSTRACT

A radiation image recording and read-out apparatus suitable for use in mammography comprises, as integrated into a single unit, a mammographic image recording section, an image read-out and erasing section and a circulation and conveyance system for circulating at least one stimulable phosphor sheet through the two sections for repeated recording and read-out of radiation images. The mammographic image recording section is attached to the image read-out and erasing section to be rotatable and vertically slidable relative thereto so as to permit free selection of the recording position during mammography. The mammographic image recording section and the image read-out and erasing section have respective slots which come into alignment at a prescribed position of the mammographic image recording section relative to the image read-out and erasing section and the stimulable phosphor sheet is transferred between the two sections by the conveyance system when the mammographic image recording section is in the prescribed position.

3 Claims, 2 Drawing Figures

MAMMOGRAPHIC RADIATION IMAGE RECORDING AND READ-OUT APPARATUS

BACKGROUND OF THE INVENTION

1. Field of the Invention

This invention relates to an integrated radiation image recording and read-out apparatus comprising an image recording section for exposing a stimulable phosphor sheet to a radiation passing through an object to have a radiation image of the object stored thereon, an image read-out section for exposing the stimulable phosphor sheet to stimulating rays which cause them to emit light in proportion to the stored radiation energy, and detecting and converting the emitted light into electric signals which are used to reproduce a visible image from the read-out image information, and an erasing section for releasing the radiation energy remaining on said stimulable phosphor sheet after read-out. This invention particularly relates to such an apparatus in which stimulable phosphor sheets are circulated and reused for recording images and more particularly to such an apparatus in which mammography is conducted in the image recording section.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in Japanese unexamined patent publication No. 56(1981)-11395 and U.S. Pat. Nos. 4,258,264, 4,315,318, 4,387,428 and 4,276,473, it has been proposed to use a stimulable phosphor in a radiation image recording and reproducing system. Specifically, a sheet comprising the stimulable phosphor (hereinafter referred to as a stimulable phosphor sheet) is first exposed to a radiation passing through an object such as a part of the human body to have a radiation image stored thereon, and then is scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed so as to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of stimulable phosphor sheets loaded on the mobile X-ray diagnostic station should be minimized. Therefore, it is desirable to load the mobile X-ray diagnostic station with stimulable phosphor sheets which can be used repeatedly, once store the radiation images of the objects on the stimulable phosphor sheets, transfer the electric image signals read out from the stimulable phosphor sheets onto a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining on the stimulable phosphor sheet after it is scanned with stimulating rays to read out the radiation image stored thereon should be eliminated or erased as described, for example, in Japanese unexamined patent publication No. 56(1981)-12599 and U.S. Pat. No. 4,470,619. The stimulable phosphor sheet can then be used again for radiation image recording.

From the practical point of view, therefore, it is very convenient to use an integrated apparatus in which at least one stimulable phosphor sheet is reused by repeatedly circulating it through an image recording section for recording a radiation transmission image of an object on the stimulable phosphor sheet by exposing it to a radiation passing through the object, an image read-out section for reading-out the radiation image stored on the stimulable phosphor sheet in the image recording section, and an erasing section for releasing the radiation energy remaining on the stimulable phosphor sheet after read-out so as to prepare it for recording of the next image thereon. This is because such an integrated apparatus can be easily installed in a mobile X-ray diagnostic station, thus making it easier to move from place to place for mass examinations, or in a hospital or the like.

The applicant therefore proposed in U.S. patent application No. 600,689 an integrated radiation image recording and read-out apparatus comprising an image recording section, an image read-out section and an erasing section built into a single unit further provided with a circulation and conveyance system for enabling circulation and reuse of at least one stimulable phosphor sheet.

On the other hand, various different types of radiation image recording apparatuses are used depending on the part of the human body to be examined and in some of these apparatuses it is difficult to integrate the image recording apparatus with an image read-out section and an erasing section. This is true, for example, in the case of the mammographic radiation image recording apparatus used for carrying out examinations for detecting breast cancer.

In a mammographic radiation image recording apparatus it is necessary to be able to record radiation images at different angles with respect to the breast. The apparatus therefore has to be constructed so as to allow the radiation source and the image recording medium to revolve unitarily about the breast being mammographed. Thus, when an attempt is made to use a stimulable phosphor sheet as the image recording medium in the mammographic radiation image recording apparatus and to construct the apparatus so that the mammographic radiation image recording apparatus is integrated with an image read-out section and an erasing section, the structure becomes mechanically complex because of the need to revolve the heavy image read-out section and/or erasing section together with the image recording section and, moreover, the amount of power required for revolving these sections becomes disadvantageously large.

SUMMARY OF THE INVENTION

The purpose of this invention is to provide an integrated radiation image recording and read-out apparatus for mammography which is simple in structure and does not consume a large amount of power during image recording.

The present invention provides a radiation image recording and read-out apparatus comprising:

(i) a mammographic image recording section provided with a radiation source for emitting radiation through a human breast onto a stimulable phosphor sheet and an image recording case having therein a sheet holding means for holding the stimulable phosphor sheet in an image recording position as opposed face to face to the radiation source, (ii) an image read-out and erasing section provided with (a) an image read-out means consisting of a stimulating ray source for emitting stimulating rays for scanning said stimulable phosphor sheet carrying a mammographic radiation image stored thereon in the mammographic image recording section and a photoelectric read-out means for detecting light emitted from said stimulable phosphor sheet scanned with said stimulating rays to obtain an electric image signal, and (b) an erasing means for, prior to the next image recording on said stimulable phosphor sheet for which the image read-out has been conducted in said image read-out section, releasing the radiation energy remaining on the stimulable phosphor sheet, and (iii) a circulation and conveyance system for conveying the stimulable phosphor sheet from the image recording case of the mammographic image recording section through the image recording means and the erasing means and back to the image recording case, wherein the mammographic image recording section is attached to the read-out and erasing section so as to be movable with respect thereto.

Preferably the radiation image recording and read-out apparatus according to the present invention comprises an image read-out and erasing section which is installed to maintain a fixed position and a mammographic image recording section arranged to be movable relative to the image read-out and erasing section, the image recording case of the mammographic image recording section has a first openable and closable slot for conveying a stimulable phosphor sheet in and out thereof and a first conveyance means linking this first slot and the sheet holding means for holding a stimulable phosphor sheet at the image recording position, a stimulable phosphor sheet erased to release any image information stored thereon being sent into the image recording case through the first slot and conveyed by the first conveyance means to the sheet holding means, a radiation image being recorded on the stimulable phosphor sheet, the stimulable phosphor sheet being conveyed back to the first slot by the first conveyance means, and the stimulable phosphor sheet being sent out of the image recording case through the first slot, the image read-out and erasing section has a second openable and closable slot for conveying stimulable phosphor sheets in and out thereof and a second conveyance means (circulation and conveyance means) linking the second slot, the image read-out means for reading out image information from the stimulable phosphor sheet and the erasing means for releasing radiation energy remaining on the stimulable phosphor sheet after read-out, the sheet sent out from the mammographic image recording section through the first slot being sent into the image read-out and erasing section through the second slot and conveyed by the second conveyance means to the image read-out means, the erasing means and back to the second slot and then being sent out of the image read-out and erasing section through the second slot and into the mammographic image recording section through the first slot.

At a prescribed position of the mammographic image recording section within the moveable range thereof the first and second slots are opposed to each other so as to enable a stimulable phosphor sheet to be conveyed back and forth between the first and second conveyance means via the first and second slots.

As in the radiation image recording and read-out apparatus according to this invention the mammographic image recording section is moveable relative to the image read-out and erasing section, the apparatus can be realized using a simple mechanical arrangement and the amount of power required for image recording is small.

Moreover, since the first slot provided in the mammographic image recording section and the second slot provided in the image read-out and erasing section are opposed to each other at a predetermined position of the mammographic image recording section, the stimulable phosphor sheet can be conveyed back and forth between the first conveyance means provided in the mammography image recording section and the second conveyance means provided in the image read-out and erasing section. As a result, it is possible to continuously carry out the recording, read-out and erasure of radiation image information by repeatedly circulating one or more stimulable phosphor sheets through the apparatus. Consequently, the inconvenience of having to set cassettes or the like in place that has heretofore attended the radiation image recording and read-out operation is eliminated and the operation is simplified. Also, the fact that the stimulable phosphor sheet can be repeatedly circulated and used continuously makes the apparatus according to this invention particularly useful for conducting mass medical examinations since it does away with the need to stock a large number of cassettes or the like when carrying out such examinations.

DESCRIPTION OF THE PREFERRED EMBODIMENTS

The present invention will hereinbelow be described in further detail with reference to the accompanying drawings.

Figure 1:
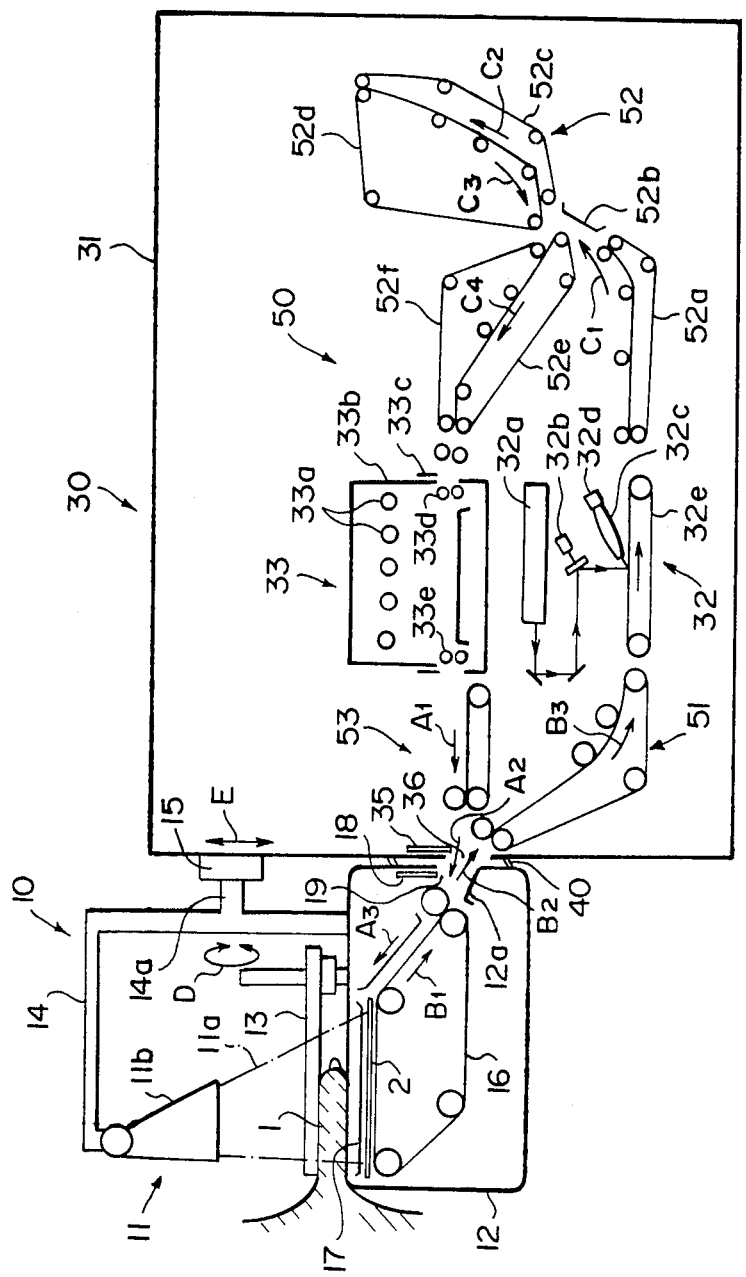
FIG. 1 is a schematic sectional side view of a first embodiment of the radiation image recording and read-out apparatus according to this invention.

Referring to FIG. 1, the radiation image recording and read-out apparatus comprises a mammographic image recording section 10 and an image read-out and erasing section 30. The mammographic image recording section 10 comprises a radiation source 11 for emitting the radiation required for image recording, an image recording case 12 made of a light shielding material which serves as a support table for a breast 1 and houses therein a stimulable phosphor sheet 2 and a breast depressor plate 13 for retaining the breast 1 in position by pressing it onto the top of the image recording case 12. The breast depressor plate 13 is attached to the image recording case 12 and its use is optional. The radiation source 11 is provided at one end of an arm 14, the other end of which has the image recording case 12 attached thereto. The arm 14 is provided at an intermediate portion thereof with a support leg 14a which is fixed to a support base 15 so as to be rotatable in the direction of the arrow D. The support base 15 is fixed on the outer surface of the case 31 of the image read-out and erasing section 30 so as to be movable up and down as indicated by the arrow E. As a result of this arrangement, the arm 14 having the radiation source 11 and the image recording case 12 attached at the opposite ends thereof is free to slide vertically (in the direction of the arrow E) and is also free to rotate about the support leg 14a as indicated by the arrow D.

Within the image recording case 12 are disposed a first conveyance means 16 consisting of an endless belt supported on rollers and used for conveying the stimulable phosphor sheet 2, and a plate-shaped sheet holding means 17 positioned to stand face to face with the first conveyance means 16 for holding the stimulable phosphor sheet 2 within the field of radiation of the radiation source 11a. One side of the image recording case 12 is provided with a first slot 19 having an openable and closable door 18 and the first conveyance means 16 is arranged for conveying the stimulable phosphor sheet 2 back and forth between the position at which it is held by the sheet holding means 17 and the first slot 19.

The case 31 of the image read-out and erasing section 30 is made of a light shielding material and houses therein an image read-out means 32 and an erasing means 33. The side of the case 31 facing the mammography image recording section 10 is provided with a second slot 36 having an openable and closable second door 35. At the image read-out means 32, the stimulable phosphor sheet 2 carrying a radiation image stored thereon is scanned by stimulating rays emitted by a stimulating ray source 32a and reflected off a galvanometer mirror 32b as it is swung in both directions, thereby causing the stimulating rays to scan the sheet 2 in the main scanning direction, while the sheet 2 is simultaneously being conveyed by an endless belt 32e in the sub-scanning direction. When the sheet 2 is scanned by the stimulating rays it emits light in proportion to the image information stored thereon and the emitted light is guided by a light guide member 32c to a photomultiplier 32d which converts it into an electric image signal. At the erasing means 33, the stimulable phosphor sheet is exposed to erasing light emitted by a plurality of erasing light sources 33a so as to release any radiation energy remaining thereon after read-out, whereby the stimulable phosphor sheet is put in condition for reuse.

At the image read-out means 32, the stimulating ray source 32a, which in this embodiment is a laser beam source, is positioned above the endless belt 32e constituting a part of the image read-out means 32, and the galvanometer mirror 32b is positioned for scanning the laser beam emitted by the laser beam source 32a in the width direction of the sheet 2 placed on the endless belt 32e. The galvanometer mirror 32b is swung in both directions to scan the laser beam in the main scanning direction on the sheet 2 carrying the radiation image stored thereon. The sheet 2 has been subjected to image recording at the mammography image recording section 10 and then conveyed with the assistance of the first conveyance means 16 to the image read-out means 32. The light emitted by the sheet 2 directly toward the light guide member 32c and the light emitted thereby and reflected by a light guiding reflection mirror both enter the light guide member 32c from a light input face thereof, and are guided inside of the light guide member 32c by total reflection to a light output face thereof. The light is thus detected by the photomultiplier 32d connected to the light output face thereof. Simultaneously with the scanning of the sheet 2 by the laser beam in the main scanning direction, the sheet 2 is moved by the endless belt 32e in the sub-scanning direction, as indicated by the arrow, approximately normal to the main scanning direction, so that the radiation image information is read out from the whole surface of the sheet 2. The electric image signal obtained from the photomultiplier 32d is sent to an image processing circuit (not shown) for processing the electric image signal as required. The image signal thus processed is then sent to an image reproducing apparatus. The image reproducing apparatus may be a display device such as a CRT (cathode ray tube), or a device for recording a visible image by point-by-point scanning on a photographic film. Or, the image signal may be stored in a storage means such as a magnetic tape.

The time required for reading out a radiation image from one sheet 2 is generally longer than the time required for recording the radiation image on the sheet 2. However, it is possible to quickly finish image recording on a plurality of the sheets 2 and maintain the exposed sheets 2 one by one, for example, on the endless belts of the conveyance system. Also, for example, Japanese Unexamined Pat. Publication No. 58(1983)-89245 discloses a method wherein a read-out operation for detecting the image information of a radiation image stored in a stimulable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out gain is adjusted and/or appropriate signal processing is conducted to obtain a visible image having an improved image quality, particularly a high diagnostic efficiency and accuracy, regardless of radiation exposure conditions. In the apparatus of the present invention, too, it is possible to conduct the final read-out by returning the sheet 2, which has been sent onto an endless belt 52a after preliminary image read-out, back to the image read-out start position by reversely rotating the endless belts 52a and 32e.

After image read-out is finished, the sheet 2 is conveyed to the erasing means 33. The erasing means 33 comprises a case 33b and a plurality of erasing light sources 33a, e.g. fluorescent, tungsten, xenon or sodium lamps, arranged within the case 33b. Then a shutter 33c is closed, and the erasing light sources 33b are turned on. The erasing light sources 33a mainly emit light having a wavelength within the stimulation wavelength range for the stimulable phosphor of the sheet 2. When the sheet 2 is exposed to the erasing light, the radiation energy remaining on the sheet 2 after the image read-out is released. At this time, since the shutter 33c is closed, no noise is generated in the read-out signal by erasing light leaking into the image read-out means 32.

After the radiation energy remaining in the sheet 2 is erased to such an extent that the next image recording on the sheet 2 is possible, nip rollers 33e are rotated and the sheet 2 is conveyed out of the erasing section 33.

The conveyance of the stimulable phosphor sheet 2 through the image read-out and erasing section 30 is carried out by a second conveyance means 50 comprising a first endless belt 51 for conveying the sheet 2 from the second slot 36 to the image read-out means 32, a second endless belt 52 including a switchback mechanism for conveying the sheet 2 from the image read-out means 32 to the erasing means 33 in such manner that the side of the sheet 2 facing upward at the image recording means 32 also faces upward at the erasing means 33, and a third endless belt 53 for conveying the sheet 2 from the erasing means 33 to the second slot 36.

Within the permissible range of movement of the mammographic image recording system 10 with respect to the image read-out and erasing section 30, it is only when the mammographic image recording system comes into the prescribed position illustrated in the figure that the first slot 19 is aligned with the second slot 36, and at the time the first and second slots 19 and 36 are in alignment external light is prevented from reaching the overlapped region thereof by a light shield means 40. Therefore, even when the doors 18 and 35 of the slots 19 and 36 are opened, there is no danger of external light leaking into the image recording case 12 or the case 31 of the image read-out and erasing section 30.

The operation of the radiation image recording and read-out apparatus according to this invention will now be described in detail.

First, in preparation for supplying a stimulable phosphor sheet 2 to the mammographic image recording section 10, the mammographic image recording section 10 is brought to the prescribed position for aligning the first slot 19 with the second slot 36. The first and second doors 18 and 35 are then opened and the third endless belt 53 is operated to feed a stimulable phosphor sheet 2 which has been erased of any residual radiation energy at the erasing section 33 in the direction of the arrow A1. The sheet 2 is thus conveyed through the second slot 36 and the first slot 19 and into the image recording case 12, as indicated by the arrow A2. In the image recording case 12, the sheet 2 is directed upwardly onto the endless belt of the first conveyance means 16 by a guide plate 12a and is thereafter conveyed by the first conveyance means 16 in the direction of the arrow A3 until reaching the image recording position, i.e., until being fully inserted into the space between the sheet holding means 17 and the belt. Once the sheet 2 is retained in the image recording position by the sheet holding means 17, the first and second doors 18 and 35 are closed.

Next, the arm 14 is moved vertically (in one of the directions indicated by the arrow E) and rotated about the support leg 14a (in one of the directions indicated by the arrow D) in order to bring the radiation source 11 into the desired image recording position with respect to the breast 1. After the breast depressor plate 13 has been brought against the breast 1 to hold it in position, the radiation source 11 is activated to expose the stimulable phosphor sheet 2 to radiation passing through the breast 1. At this time, the upper surface of the image recording case 12 serves as a support table for the breast 1. A transmission radiation image of the breast 1 is thus stored on the stimulable phosphor sheet 2. When image recording is finished, the arm 14 moves to bring the first and second slots 19 and 36 back into alignment, whereafter the endless belt of the first conveyance means 16 is reversely rotated to convey the sheet 2 in the direction of the arrow B1. The first and second doors 18 and 35 are opened and the sheet 2 passes through the first slot 19 and the second slot 36 and into the image read-out and erasing section 30, as indicated by the arrow B2. The direction of conveyance by the first conveyance means 16 is arranged such that the sheet 2 entering the image read-out and erasing section will at this time be conveyed onto the first endless belt 51, which in turn conveys it in the direction of the arrow B3 to the image read-out means 32. After image read-out is finished at the image read-out means 32, the sheet 2 is conveyed to the erasing means 33 by the second endless belt 52, following the course indicated by the arrows C1 to C4. The sheet 2 erased of residual radiation energy in the erasing section to such an extent that it can be reused for image recording is conveyed onto the third endless belt 53, where it stands by until required again for image recording in the mammographic image recording section 10.

The second conveyance means 52 has the switchback mechanism mentioned above. After the image read-out is conducted on the sheet 2 at the image read-out means 32, the sheet 2 is conveyed along the endless belt 52a and a guide plate 52b, and then conveyed in the direction as indicated by the arrow C1 by being grasped between endless belts 52c and 52d. When a position sensor or the like detects that the sheet 2 has been conveyed until the rear end of the sheet 4 is grasped between the endless belts 52c and 52d, the endless belts 52c and 52d are rotated reversely to switch back the sheet 4 in the direction as indicated by the arrow C3. The sheet 2 conveyed by the endless belts 52c and 52d in the direction as indicated by the arrow C3 is then grasped between endless belts 52e and 52f facing the left ends of the endless belts 52c and 52e, and conveyed by the conveyor belts 52e and 52f to the erasing means 33. At this time, the sheet 2 is moved reversely by the switchback conveyance, and conveyed into the erasing section 32 with the stimulable phosphor surface of the sheet 2 facing up so that the stimulable phosphor surface of the sheet 2 is exposed to erasing light emitted by the erasing light sources 33a.

By repeating the aforesaid operations, it is possible to circulate and reuse the stimulable phosphor sheet 2 repeatedly.

When the first and second slots 19 and 36 are aligned for enabling conveyance of the stimulable phosphor sheet 2 back and forth between the mammographic recording section 10 and the image read-out and erasing section 30, the light shielding means 40 prevents external light from reaching the region at which the two slots confront each other, thus preventing any degradation of the radiation image recorded on the stimulable phosphor sheet due to exposure to external light.

In the apparatus according to this invention, if it is desired to record an enlarged image of the breast 1 on the stimulable phosphor sheet 2, this can be realized by further positioning a hollow plastic jig between the breast 1 and the top of the image recording case 12 so as to increase the distance between the sheet 2 and the breast 1 in the mammographic image recording section 10.

Also, if a projection is provided on the surface of the breast depressor plate 13 that comes in contact with the breast 1 and the field of radiation from the radiation source 11 is stopped down to the size of the portion of the breast depressed by the projection, it becomes possible to conduct spot radiation image recording to obtain a partially contrasted radiation image. In this case, for stopping down the radiation field, the radiation source 11 is provided with a treatment cone 11b, of small diameter.

Figure 2:
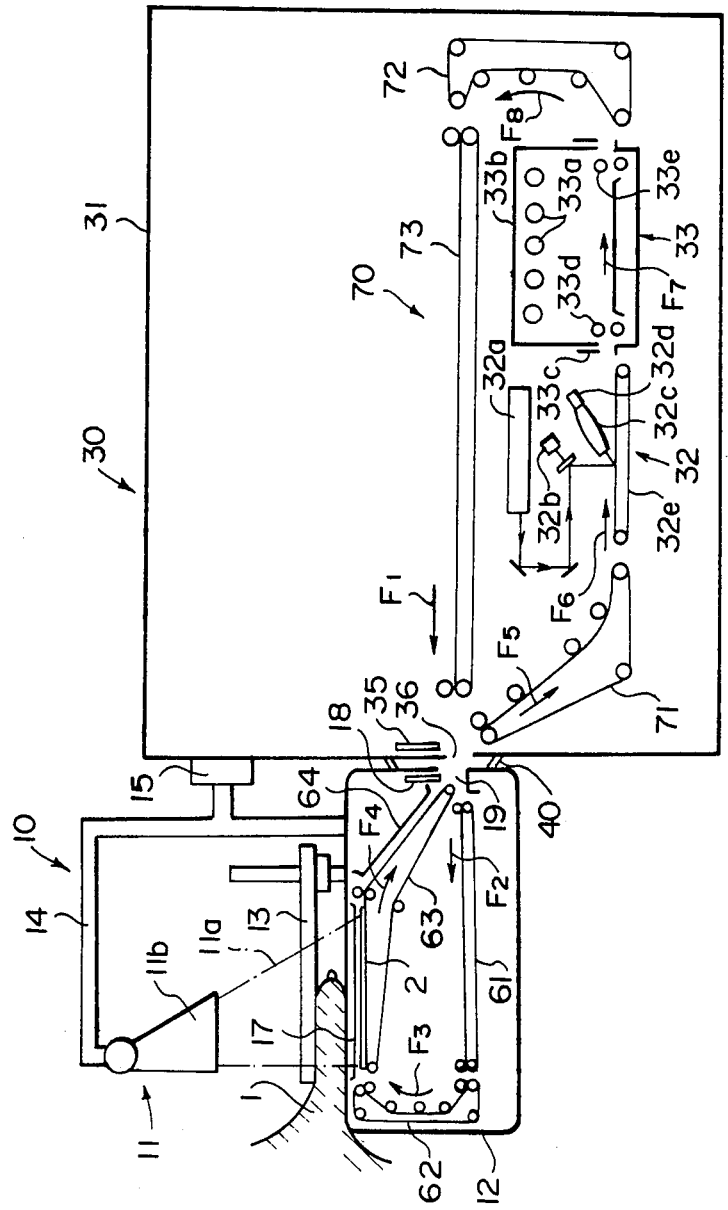
FIG. 2 is a schematic sectional side view of a second embodiment of the same.

A second embodiment of the radiation image recording and read-out apparatus according to this invention is illustrated in FIG. 2. This second embodiment differs from the first embodiment only in the structure within the image recording case 12 and the arrangement of the sheet conveyance system within the image read-out and erasing section 31. Therefore, only the points of difference will be explained. In FIG. 2, parts analogous to parts in FIG. 1 are assigned the same reference numerals as those in FIG. 1 and no further explanation of their structure or operation will be given here.

The image recording case 12 in this embodiment is provided on its side facing the image read-out and erasing section 30 with a first slot 19 having a first door 18. When the image recording case 12 is moved relative to the case 31 so as to bring the first slot 19 into alignment with a second slot 36 formed in the case 31 and having a second door 35, it becomes possible to convey the stimulable phosphor sheet 2 back and forth between the image recording case 12 and the image read-out and erasing section 31 via the first and second slots 19 and 36. When a sheet 2 which has been erased of residual radiation energy is conveyed into the image recording case 12 through the slots 19 and 36, it is, for reasons that will be apparent later, conveyed horizontally with its stimulable phosphor surface facing downward. Therefore, after it enters the image recording case 12, it remains face down and is conveyed in this condition in the direction indicated by the arrow F2 by an endless belt 61 positioned in the lower part of the recording case 12. The sheet 2 is then transferred to an endless belt 63 which conveys it in the direction of the arrow 3 until it becomes sandwiched between the sheet holding means 17 and an endless belt 63. In the process of this conveyance, the sheet 2 is inverted so that its stimulable phosphor surface faces upward when it arrives at the sheet holding means 17. The sheet 2 can thus be retained in the recording position by the sheet holding means 17 so as to have its stimulable phosphor surface exposed to radiation passing through the breast 1. After a radiation image of the breast 1 is stored on the stimulable phosphor sheet 2, the sheet 2 is conveyed in the direction of the arrow F4 by the endless belt 63 to be passed diagonally downward into the image read-out and erasing section 30 via the first and second slots 19 and 36.

As a consequence, the sheet 2 arrives on an endless belt 71 with its stimulable phosphor surface facing upward and is conveyed by the endless belt 71 in this condition in the direction indicated by the arrow F5. The sheet 2 is thus conveyed into the image read-out means 32 where the radiation image stored thereon is read out by scanning the sheet 2 with stimulable rays in exactly the same manner as described with respect to FIG. 1. After read-out is finished, the sheet 2 is conveyed to the erasing means 33 where it is erased of residual radiation energy in the same manner as in the apparatus of FIG. 1. Next the sheet 2 is conveyed by an endless belt 72 in the direction of the arrow F8 and as a result is placed on an endless belt 73. During this conveyance the sheet is again inverted so that its stimulable phosphor surface is facing downward upon its arrival at the endless belt 73.

Thus after completion of a first cycle of image recording, image read-out and erasing operations as described in the foregoing, the sheet 2 is ready to be again conveyed into the image recording case 23 by the endless belt 73, horizontally and stimulable phosphor surface facing downward, so as to begin the second cycle of operations. The transfer of the stimulable phosphor sheet 2 back and forth between the image recording case 12 and the image read-out and recording section is carried out with the mammography image recording section 10 in the prescribed position, i.e., with the first slot 19 of the mammography image recording section 10 aligned with the second slot 36 of the case 31, and after the transfer has been completed the first and second doors 18 and 35 are closed. The mammography image recording section 10 can then be moved as required relative to the image read-out and erasing section 1.

We claim:

1. A mammographic radiation image recording and read-out apparatus comprising:
    (i) a mammographic image recording section (10) provided with a radiation source (11) for emitting radiation through a human breast onto a stimulable phosphor sheet (2) and an image recording case (12) having therein a sheet holding means (17) for holding the stimulable phosphor sheet stationary in an image recording position during exposure, opposite to and facing the radiation source,
    (ii) an image read-out and erasing section (30) provided with (a) an image read-out means comprising a stimulating ray source for emitting stimulating rays for scanning said stimulable phosphor sheet carrying a mammographic radiation image stored thereon in the mammographic image recording section and a photoelectric read-out means for detecting light emitted from siad stimulable phosphor sheet scanned with said stimulating rays to obtain an electric image signal, and (b) an erasing means for, prior to the next image recording on said stimulable phosphor sheet for which the image read-out has been conducted in said image read-out section, releasing the radiation energy remaining on the stimulable phosphor sheet; and
    (iii) a circulation and conveyance system for conveying the stimulable phosphor sheet from the image recording case of the mammographic image recording section through the image recording means and the erasing means and back to the image recording case, wherein the mammographic image recording section is attached to the read-out and erasing section so as to be moveable with respect thereto.

2. An apparatus as defined in claim 1 wherein said radiation source and said image recording case are mounted on opposite ends of an arm which is attached to said image read-out and erasing section to be rotatable and vertically slidable relative thereto.

3. An apparatus as defined in claim 2 wherein said image recording case has a slot, said image read-out and erasing section is housed in a case having a slot and said slots come into alignment at a prescribed position of the mammographic image recording section with respect to the image read-out and erasing section, wherein the stimulable phosphor sheet can be transferred between the mammographic image recording section and the image read-out and erasing section through said slots by the circulation and conveyance system when the mammographic image recording section is in said position.

* * * * *